United States Patent [19]

Skarra et al.

[11] Patent Number: 4,735,811

[45] Date of Patent: Apr. 5, 1988

[54] TORTILLA AND METHOD OF MANUFACTURE

[75] Inventors: Leslie L. Skarra, Tonka Bay; Katy Ghiasi, St. Anthony Village; James R. Evans, Burnsville; Ernst Graf, Coon Rapids, all of Minn.

[73] Assignee: The Pillsbury Company, Minneapolis, Minn.

[21] Appl. No.: 791,243

[22] Filed: Oct. 25, 1985

[51] Int. Cl.[4] .................... A21D 13/00; A21D 8/02
[52] U.S. Cl. .................................. 426/128; 426/138
[58] Field of Search ..................... 426/138, 439, 549

[56] References Cited

U.S. PATENT DOCUMENTS 3,653,915  4/1972  Rubio .
3,655,385  4/1972  Rubio .
4,241,106  12/1980  Tims .

*Primary Examiner*—Raymond N. Jones
*Assistant Examiner*—Carolyn Paden
*Attorney, Agent, or Firm*—Robert J. Lewis

[57] ABSTRACT

An improved tortilla is provided which has increased shelf life while maintaining improved flexibility over the shelf life. The tortilla is comprised of flour, water and other plasticizing agents to provide a low moisture content product still having a high liquid content. The tortilla is cooked to completely gelatinize the starch in the interior of the tortilla. The tortilla is cooled, packaged and stored having about a ninety (90) day shelf life while maintaining sufficient flexibility to prevent appreciable cracking when folded for use.

34 Claims, No Drawings

TORTILLA AND METHOD OF MANUFACTURE

BACKGROUND

Tortillas are a popular food and have been made and served fresh for many years. Because they are made and served fresh they require a shelf life of only two or three days. This is adequate for restaurant uses and home use when made from scratch but has not been adequate for consumer sales because of degradation over the shelf life required for typical consumer sales distribution systems.

There has been an increase in the popularity of Mexican foods in recent years. However, the ability to distribute tortillas through normal channels of sale and distribution has limited their commercial production and acceptance. Some success has been achieved to date by varying formulae and processing conditions to achieve improved distribution and product quality. However, the maximum shelf life obtainable for these products, whether they are shelf-stable or refrigerated, has been limited both in duration or quality at the time of consumption. A typical, good shelf life of current products on the market is, at best, about ten (10) days.

The main mode of failure of these products is loss of flexibility. With a loss of flexibility when the tortilla is filled and wrapped, the shell breaks along the folds causing loss of contents and loss of appeal. Even with reheating of current product, as for example on a griddle, there is some regaining of flexibility but not sufficiently to have a high-quality product.

It is believed that the loss of flexibility is due to staling of the product, which is probably a retrogradation of the starch. Staling is a very complicated and little understood phenomena, and solutions to staling and/or retrogradation generally have not been successfully achieved. However, one recent solution to staling has been provided and is disclosed in U.S. Pat. No. 4,456,625, Storage Stable, Ready to Eat Baked Goods. This reference retards staling by substantially preventing gelatinization of the starch during cooking. Such a solution was adequate for some products but was not amenable to tortillas because tortillas need to be highly gelatinized for strength.

The starch in baked goods is by no means a system in thermodynamic equilibrium. Changes in the starch gel structure referred to as staling start immediately after cooling. Staling is a complex physiochemical phenomena and a considerable economic problem encountered in the baking industry. It refers to total family of post-production changes that occurs during the distribution and shelf life of a starch based product. Numerous studies to determine the cause of bread staling have indicated that changes in the starch component are of major importance. The predominant mechanism of staling is the recrystallization of starch from the amorphous state of the freshly heated product to the partially crystalline state of the stale product, with concomitant redistribution of moisture, increased firmness, changes in mouthfeel, and changes in flavor. The recrystallization depends strongly on the history of the product; both the initial heating and the type of ingredients will contribute to this overall retrogradation process. However, as will be described later, the starch in the present invention is cooked to substantial gelatinization.

Due to confusion associated with the definition of gelatinization, a brief explanation of this phenomena is provided.

The starch granule is a partially crystalline glassy polymer system composed of two molecular entities: amylopectin which is a glucose copolymer and amylose which is a linear homopolymer of glucose. Gelatinization refers to the sequence of changes which occur when starch is heated with water. During this heating process, the appearance of granules does not change until a certain critical temperature range is reached, at which the granules swell and lose their polarization or birefringence cross. Both swelling and loss of birefringence start at the botanical center, or hilum of the starch granule, and rapidly progress to the periphery. The loss of birefringence is a simple and widely used test as an indication of starch gelatinization. However, it only indicates a degree of gelatinization. The difference in the degree of association in the amorphous regions of individual granules is responsible for gelatinization occurring over a temperature range rather than at a single temperature.

After loss of birefringence, the granules continue to swell, and solubles leach from the granules into surrounding media i.e. become further gelatinized. The diffusion of solubles, primarily amylose from the granules during the gelatinization, and swelling and partial distortion of granules make contact between the granules possible thereby forming a continuous matrix. This continuous starch gel in conjunction with a gluten matrix, when gluten is present, will provide the structural strength to the product.

It was found that to achieve adequate structural strength in the tortillas the internal starch granules are substantially gelatinized, as measured by loss of birefringence. An underbaked product failed to perform because of lack of structural strength. A strong correlation was found between the degree of starch gelatinization and product performance (flexibility) over time.

Tortillas, as are known in the art, normally contain high moisture and are high $A_w$ (water activity level) products. Such a high water formula aggravates the staling or retrogradation phenomena, particularly at refrigerated temperature storage. Further, if such a product is not stored under refrigerated or frozen condition, then preservatives are required to prevent microbial degradation of the product.

The desire to not use preservatives in tortillas complicates the solution to staling because in order to not use preservatives, refrigerated storage, a traditional way of storing tortillas, aggravates the staling phenomena. It is known that refrigerated temperatures about 4.5° C. (40° F.) cause the fastest staling rate in starch-based products. Thus, the use of a traditional refrigerated distribution system results in the inherent loss of flexibility in the product at the fastest rate.

Tortillas currently made are a mixture of flour, water, salt and oil to form a dough which is then sheeted and cut into the tortilla size and shape. The cut dough pieces are then baked, packaged, and stored. An evaluation of such commercially produced products shows that they are cooked very little, just enough to provide structure to the product to ease its handling. An evaluation of such products indicates that the starch is not completely gelatinized as measured by a loss of birefringence and by its Water Holding Capacity (WHC).

The problem of how to provide a tortilla which has good flexibility and long shelf life seems to be mutually exclusive when refrigerated storage is to be used. An object of the present invention is to provide an improved tortilla still that is traditional in nature providing the same eating, taste and use characteristics as a traditional tortilla in order to maximize consumer acceptance of the product as a tortilla. Another object of the present invention is to provide a tortilla which has improved shelf life with good eating characteristics, and be convenient and easy to use.

THE INVENTION

It was discovered that by the use of certain plasticizers in addition to water, in prescribed amounts and cooking the tortilla to a high degree where the starch inside the tortilla is highly gelatinized as evidenced by a loss of birefringence, a tortilla could be produced which provided a ninety (90) day shelf-life under refrigerated conditions without loss of flexibility. Further improvements can be achieved by controlling the development of a dough, the $A_w$, the thickness of the sheeted tortilla prior to cooking and the density of cooked tortilla.

In order to achieve this end result, careful balances had to be made in order to not adversely affect taste and texture of the product by the addition of additives and other compounds, and to not have a cost that would negatively impact the consumer. Also, to eliminate the use of preservatives, refrigeration was desirable but this aggravates the staling phenomenon which normally resulted in loss of flexibility over time. Further, in order to achieve a high quality tortilla, the process and product of the invention required more control than conventional or typical processes. Another complication with gluten-containing products was the desire to reduce the density, preferably by using $CO_2$ producing leavening, like yeast, which requires more time. When yeast is used, it adds to the complexity of the process over typical non yeast processes. However the yeast provides benefits such as flavor, texture and taste and is therefore desirable.

DETAILED DESCRIPTION OF THE INVENTION

The tortilla is made by first mixing sufficient plasticizer and flour to form a dough and optionally adding a leavening agent which can be either yeast or chemical (leavening can be achieved with use of non $CO_2$ producing leaveners, for example the production of steam during the cooking process). The dough can be mixed in any suitable dough mixer. It is preferred to control the dough such that the rheology of the dough after mixing and prior to forming into a web, is tested on a Farinagraph model #FA/R-2 under the standard testing procedure.

The dough rheology for doughs having above about 4% gluten (high gluten) by weight of the dry flour in Brabender unit (B.U.) value is in the range of between about 500 and about 1600, preferably in the range of between about 700 and about 1200, and more preferably in a range of between about 850 and about 900. When the dough has less than about 4% gluten (low gluten) by weight of the dry flour the B.U. value of the dough is in the range of between about 350 and about 1000, preferably in the range of between about 550 and about 900, and more preferably in the range of between about 750 and about 800. High gluten doughs should be mixed and worked on line until peak development is achieved. This can be tested by the stretch test as known in the art. Mixing of high gluten doughs is preferably done until peak development is achieved.

The dough is a mixture of flour, plasticizer and leavener if desired. Further, the dough can include salt, dough conditioners, flavorings, etc., as known in the art.

The preferred starch containing flour is a cereal grain flour with the most preferred being wheat or corn flour. Also, combinations of different cereal grain flours can be used. The flour provides the physical strength of the finished product via a starch matrix, or in the case of gluten containing flour e.g. wheat, a three-dimensional starch-gluten matrix. Preferably at least a majority of the starch (or flour) is from either wheat or corn.

With specific reference to wheat flour, the protein development during mixing and sheeting are affected by both the type of wheat and its milling specifications. The preferred wheat flour is a blend of hard winter and spring wheat. The exact amount of flour required may vary depending on its moisture content and absorption value, as well as other ingredients in the formula. The flour, on a dry basis, is present preferably in the range of between about 40% and about 65%, more preferably in the range of between about 43% and about 60%, and most preferably in the range of between about 45% and about 55% by weight of dough.

When yeast is used, preferably in a brew process, it serves three basic functions: (a) leavening action, as a result of carbon dioxide production; (b) flavor development, a consequence of the formation of alcohols and esters and other flavor precursors; and (c) dough development, the result of fermentation.

The plasticizer component of the dough can include several types of plasticizer. By definition a plasticizer is a material incorporated in polymer to increase workability, flexibility or extensibility. Plasticizers include water, alcohol, polyhydric alcohols such as glycerol or sorbitol, fats such as shortening and/or oil, etc. It is preferred that the total plasticizer content of the dough be in the range of between about 35% and about 60%, preferably in the range of between about 37% and about 49%, and most preferably in the range of between about 40% and about 48% by weight of dough.

Water is the most important plasticizer for hydrophilic food polymers such as protein, starch and polysaccharides. The degree of plasticization has a profound effect on structural properties and determine the rheological behavior of the dough. The total water in the dough should be in the range of between about 30% and about 55%, more preferably in the range of between about 32% and about 50%, and most preferably in the range of between about 34% and about 45% by weight of dough. The amount of water has a large impact on the initial quality and shelf life stability of the final products. If the moisture of the cooked product is too low, say for example below 15%, the tortilla shows little moistness and tenderness, elasticity and flexibility. If the water content of the cooked product is too high, say for example above about 27% in the cooked product, the eating quality is still good; however, they tend to fail over a 90 day shelf life because the water activity level ($A_w$) would be above about 0.90 causing microbiological degradation of the product and a high water content which favors starch retrogradation (recrystallization) leading to loss of flexibility and elasticity in about 2-3 weeks. Depending upon the distribution system this 2-3 week shelf life can be objectionable. Typical art tortillas after cooking contain approximately 30% total moisture. The water level in the dough should be adequate to provide a waterholding capacity (WHC) of greater than about 1.50 in the cooked product for shelf life stability.

One of the ways of quantifying starch retrogradation or staling of baked goods during shelf life has been through the use of measuring WHC. Starch recrystallization is usually accompanied by a decrease in WHC which was found to correlate with the loss in flexibility of tortillas.

The plasticizer component can also include such things as polyhydric alcohols, for example glycerol or sorbitol as an important ingredient for preservative-free 90 day stable tortillas. Glycerol not only acts as a plasticizing agent, allowing a reduction in the overall total water content while maintaining a higher nonfatty fluidity that is important for moistness, tenderness and flexibility. Low moisture content is desirable to inhibit starch retrogradation and prolong shelf life to approximately 90 days. Secondly, glycerol also lowers the water activity level of tortillas by allowing the reduction of the total water content and by reducing the activity of the remaining water through its colligative properties. Preferably the polyhydric alcohol components of the plasticizer are present in the range of 2% and 10%, more preferably in the range of 3% and 8% and most preferably in the range of 5% and 7% by weight of dough.

Another component of the plasticizer portion of dough can be fats such as shortening and oil. It is desirable to provide fat, such as shortening, in the tortillas because of its textural effect. It helps provide a light, tender tortilla. Preferably shortening is present in the range of 0% and about 10%, more preferably in the range of 2% and 8%, and most preferably in the range of 4% and 6% by weight of dough. Oil acts as a plasticizer and improves the tenderness and moistness of the tortilla. It also allows partial replacement of the total water to lower the water activity while keeping the fluid content high. A preferred oil is an oil which has bland odor, flavor and taste, with low or no perceivable oiliness. Oil is present in the dough in the range of 0% and 10%, preferably in the range of 0.5% and 6% and most preferably in the range of 1% and 3% by weight of dough. Total fat content is in the range of between about 5% and about 16%, preferably in the range of between about 6% and about 12% and more preferably in the range of between about 7% and about 9% by weight of dough.

If the dough after mixing is leavened by either yeast or chemical leaveners, it is given adequate floor time for proofing or fermentation, which is adequate to allow the dough to rise in volume about 5% prior to extruding. The dough, after proofing if done or before sheeting if there is no proofing, has a density in the range of between about 0.95 g/cm$^3$ and about 1.25 g/cm$^3$, preferably in the range of between about 1.00 g/cm$^3$ and 1.10 g/cm$^3$, and most preferably in the range of between about 1.04 g/cm$^3$ and about 1.06 g/cm$^3$.

Yeast is added to the dough either through the straight dough, sponge method or the brew method. Yeast performs several functions in the system. The most important ones are flavor development and CO$_2$ generation. Yeast flavors are developed during fermentation providing a highly desirable taste and odor component. Yeast also produces carbon dioxide during fermentation which diffuses into the cells produced during mixing of the dough. Carbon dioxide leavening in addition to steam leavening is desirable for optimal tenderness and lightness. Preferably, yeast is added to the dough system in a range of 1% and 3% by weight of dough, with the yeast weight being that of dry yeast.

Other components can be added to dough, for example, salt for its organoleptic properties, typically added in the range of between 0.5% and 1.5% by weight of dough. Salt can also affect the water activity level of the dough, generally lowering the water activity level with increasing amounts of salt. Dough conditioners can also be added, which increase the dough tolerance to mechanical stress i.e. extruding and sheeting of the dough. The amount of the dough conditioners is dependent upon the type of dough conditioner used and the desired effect.

After proofing, if done, the dough is then formed into a continuous web or sheet. This can be done either by extruding through an extruder or by the use of corrugated rollers. The thus formed web is then passed to one or more sets of sheeting rollers to reduce the thickness of the dough web to its final desired thickness and to further develop the gluten if wheat flour is used. It is preferred that in each pair of rollers that the dough, particularly a high gluten dough, be reduced no more than about 50% of its thickness just prior to entering the roller stand. The thickness of the formed web from the extruder can be on the order of about 12 mm and immediately after recovery after finally sheeting, the web is in the range of between about 0.5 mm and about 1 mm, preferably in the range of between about 0.6 mm and about 0.9 mm, and most preferably in the range of 0.7 mm and 0.8 mm. After each roll stand, the web can be cross-rolled if desired [as is known in the art]. It is also preferred that during the web formation and sheeting that the work input into the dough be kept at a minimum level. Excessive gluten alignment in one direction causes structural weakening of the doughs and final product.

After the web is reduced to its final thickness, it then passes through a suitable cutting device as, for example, a rotating cutter head, as is known in the industry. The cutters can be round or oval depending upon the condition of the dough. A rotating cutter head is continuous in nature. The dough trim between the cut tortillas is removed and can be returned back to the extruder for re-use. It is preferred for high gluten doughs that the trim not exceed 50%, preferably 35% and most preferably about 30% by weight of the web. After cutting, it is preferred that the tortillas have a density in the range between about 0.95 g/ml and about 1.25 g/ml, preferably in the range of between about 1.0 g/ml and about 1.1 g/ml, and most preferably in the range of between about 1.04 g/ml and about 1.06 g/ml.

The tortillas are cut to a size in the range of about 150 mm and about 300 mm, however, any suitable shape or size can be utilized.

After forming and cutting, the tortillas pass into a cooking device to cook the tortillas adequately to strengthen and partially rigidify the structure and to gelatinize a majority of the starch, preferably at least about 70%, more preferably at least about 80%, and most preferably at least about 90% of the starch to the point of loss of birefringence without excessively drying the product. This is typically done in a baking oven as, for example, a one or 3-pass oven. The tortillas can be baked on both sides simultaneously or can be baked first on one side and then on another side. In a 3-pass oven, the top belt temperature is preferably between about 176° C. and about 426° C. and more preferably between about 204° C. and about 315° C. and most preferably between about 218° C. and about 245° C. The bake time is preferably between about 25 and about 62 seconds, more preferably between about 30 and about 55 seconds, and most preferably between about 42 and about 45 seconds.

Cooking is adequate to substantially gelatinize or completely gelatinize the starch as is measured by a loss of birefringence test and WHC. However, due to rapid loss of moisture from the surface of the product, the starch granules on the surface may not be gelatinized.

Generally, because of surface dehydration, there is a gradient of gelatinization through the thickness of the tortilla. Because of rapid surface-dehydration during cooking of the tortilla, the 0.06 to 0.09 mm from the surface inward from each surface of the tortilla can still show some birefringence of the starch granules. However, inside of this thin surface film, the interior of the tortilla is fully gelatinized as measured by loss of birefringence. As measured by loss of birefringence, the cooked tortilla has the starch gelatinized above about 70%, preferably above about 80%, and more preferably above about 90%. Another way of measuring the gelatinization of the product to indicate complete cooking is through the use of a test for measuring the water holding capacity of the tortilla. When starch is heated above its gelatinization temperature, hydrogen bonds continue to be disrupted and the starch granules continue to swell. Water holding capacity (WHC) is a test which determines the degree of starch swelling. The tortilla of the present invention after cooking has a WHC of greater than about 1.5, preferably greater than about 1.8 and more preferably greater than about 2. Typical tortillas currently available have a WHC of typically 1.1 to 1.2. The test for measuring WHC is as follows:

Water holding capacity (or water binding) is defined as the maximum amount of water which one gram of material will retain under low speed centrifugation. Samples of cooked product are ground to a uniform size, subsampled, and allowed to absorb water. A minimum amount of water is added such that there is enough to saturate the sample but avoid solubilization of low molecular weight components. The increase in sample weight due to water absorption is determined after separating the excess water by centrifugation. The steps are:

(1) Determine total moisture on ground sample using a suitable moisture method:
(2) Weigh 50 ML plastic centrifuge tube and record weight ±0.01 G (note: run samples in duplicate).
(3) Weigh 5.0 G of sample (±0.01 G) into tared centrifuge tube and record sample weight.
(4) Add distilled water to tube and sample. Amount of water should be between ⅓ and ½ the volume of the tube (excess water).
(5) Cover tube with parafilm or other suitable material and let tube and contents stand for 2 minutes.
(6) Shake tube vigorously by hand.
(7) Let mixture stand for 2 minutes after mixing.
(8) Repeat steps 6 and 7 once.
(9) Remove cover (parafilm or other).
(10) Centrifuge at 1600×G for 5 minutes.
(11) Carefully decant supernatant.
(12) Weigh tube and contents. Record weight.
(13) Calculate water holding capacity on dry weight basis by the formula:

$$WHC = \frac{WS - W + (M \times S)}{S(1 - M)}$$

where:
WS = Weight of centrifuge tube + sediment.
W = Weight of centrifuge tube + sample.
S = Sample weight.
M = Moisture % of sample divided by 100

After baking, the tortillas have an $A_w$ of less than about 0.94, preferably in the range of between about 0.70 and about 0.94, more preferably in the range of between about 0.75 and about 0.89, and most preferably in the range of between about 0.82 and about 0.85 for refrigerated storage products. The final total plasticizer content of the cooked product is in the range of between about 25% and about 55%, preferably in the range of between about 30% and about 47% and more preferably in the range of between about 32% and about 40% by weight of product. The final fat content of the cooked product is in the range of between about 6% and about 20%, preferably in the range of between about 7.5% and about 15% and more preferably in the range of between about 8.5% and about 11.5% by weight of product. The final total moisture content of the cooked product is less than 25% and is preferably in the range of between about 16% and about 23%, more preferably in the range of between about 17% and about 22%, and most preferably in the range of between about 18% and about 20% by weight of tortilla. The final polyhydric alcohol content of the cooked product is in the range of between about 2.5% and about 12.5%, preferably in the range of between about 4% and about 10% and more preferably in the range of between about 6% and about 9% by weight of cooked product. The cooked tortilla contains at least about 25%, preferably at least about 30% by weight starch and at least about 35% preferably at least about 40% by weight flour on a dry basis by weight of tortilla. The water to starch weight ratio of the cooked product is in the range of between about 0.6:1 and about 0.35:1, preferably in the range of between about 0.55:1 and about 0.38:1 and most preferably in the range of between about 0.45:1 and about 0.4:1. The baked tortilla also should have a density in the range of 0.3 g/ml and 0.60 g/ml, preferably in the range of 0.34 g/ml and 0.50 g/ml, and most preferably in the range of 0.36 g/ml and 0.40 g/ml. The tortilla should have a flex score of at least 3-5 as is described below. At least a majority of the starch (or flour) is preferably from either wheat or corn.

The common use for tortillas is to place filling down the center of the tortilla, fold the sides toward the center, and roll from the bottom. As mentioned earlier, the main mode of failure of these products (without reheating) is breakage while being rolled. The improved tortilla described herein has undergone severe stress tests in which the product is randomly "scrunched" in one hand and squeezed for approximately three (3) seconds. Pressure is then released and the tortilla is allowed to return to its original flat shape. It is then examined for stress cracks or fold lines and given a score based on its appearance after the "flex test." The improved tortilla being discussed has received flexibility ratings which permit it to be used for the wrapping/rolling procedure described above which typifies tortilla use—cracks are nonexistent and fold lines are only vaguely visible. Flexibility scoring is by visual evaluation with a rating of 5 being ideal. The following are the ratings:

5 = no fold lines
4 = fold lines barely visible
3.5 = fold lines clearly visible; slight edge cracking
3 = more edge cracking; some cracking in center
2 = breaks up into 2 to 3 large pieces
1 = broken into many small pieces Unlike art tortillas, the invention offers functional flexibility directly from the pouch, after reaching room temperature, without reheating. This option provides the consumer with further convenience and time. However, if desired, after purchasing the consumer can remove the desired number of tortillas from the package and warm them on the griddle, in the oven, or in the microwave. Typically, filling (spiced meat) and toppings are then placed on the tortilla and it's wrapped so that the shell encases the filling. This method of preparation transforms the tortilla into a burrito. If filled, wrapped, covered with enchilada sauce, and baked, an enchilada is produced. The product is versatile and offers a variety of new recipe ideas to the consumer.

In addition to desirable flexibility after storage, the tortilla also has other favorable characteristics: homemade appearance, yeasty flavor, tenderness, moistness, strength and resilience. These attributes are extremely important to the overall superior quality and eating performance of this product.

The tortilla of the present invention even after a shelf life of 90 days of refrigerated storage does not need reheating before use and is crack resistant when folded.

After baking, the tortillas are stacked, the correct weight is determined, and the tortillas are packaged, preferably in a hermetically-sealed plastic pouch. The packaging should have barrier properties adequate to maintain the disclosed volatilizable plasticizer (moisture) levels of the cooked products. The packages are then stored in a refrigerated condition which is at about 45° F. (7.0° C.). If refrigerated storage is not used and the product is to be shelf stable then the product needs to be modified for microbial stability. This can be done by lowering the $A_w$ and/or adding preservatives. When the product is shelf stable with no preservatives the $A_w$ should be less than about 0.70 for long storage. If storage is short or preservatives are added the $A_w$ could be higher.

It is preferred that the tortillas be quick cooled, either before or after packaging and preferably after packaging. What is meant by "quick cooling" is that the tortilla is reduced in temperature to approximately 7° C. within 24 hours, more preferably within 12 hours and most preferably within 2 hours of baking.

In order to maintain the desired flexibility through shelf life, the above defined WHC and moisture content need to be achieved. Although it is the gelatinization of starch and proper gluten development, as described above, which gives the product the initial structural strength, it was discovered that the low moisture content is an important factor in maintaining this structural strength throughout shelf life.

It was learned that by reducing the moisture content of the cooked product of the invention product, having less than 0.6 gram of water/gram of starch, and by having the before-described level of total plasticizers to provide perceived moistness to the product, flexibility can be retained throughout 90 days shelf life.

Knowing the fact that bread generally stales in less than 3 days, this result was quite unexpected and at the time difficult to explain. In an effort to understand this phenomenon, a literature search was conducted. In one of the most recent studies, *Physical Properties Of Starch In Concentrated Systems Such As Dought And Bread* by Ann-Charlotte Eliasson, 1983, the effect of water content on the enthalpy of retrogradation of wheat starch was determined by different scanning calorimetry (DSC). It was found that recrystallization of starch is extremely sensitive to the amount of water available to the starch during aging. Maximum starch recrystallization was reported at 0.8 g water/g starch. This is the typical water-to-starch ratio present in most bread and bakery products. However, we found that by changing this ratio in the product, the recrystallization was significantly reduced.

By conducting further investigations, it was learned that the invention product does not contain any free water as is measured by the DSC. This suggests that all the water in this system is bound and probably not available for physiochemical reactions.

In order to confirm if starch recrystallization is occurring or not, x-ray diffraction technique was used. X-ray diffraction patterns of several competitive tortillas indicated the development of B-patterns and an increase in the degree of crystallinity over time, which both are indicative of starch retrogradation. However, no significant changes in the x-ray diffraction pattern of the invention tortilla was observed.

All the evidence supported the initial hypothesis that because of the low water/starch ratio, molecular mobility in this system is greatly reduced and starch recrystallization, as well as any other physiochemical changes, are partially inhibited.

What is claimed is:

1. A long shelf life, flexible and crack resistance packaged and starch based cooked dough food item, said food item comprising:
   (a) flour which contains starch, said flour being present in an amount wherein said starch is present in an amount of at least about 25% by weight of cooked food item, with at least a majority of the starch being gelatinized as measured by loss of birefringence;
   (b) plasticizer in the range of between about 25% and about 55% by weight of said cooked food item, said plasticizer including water which is present in an amount such that said cooked food item contains less than about 25% total water by weight of said cooked food item and has a water holding capacity above about 1.5; and
   (c) whereby said cooked food item is flexible directly from the package after reaching room temperature, without heating.

2. A cooked food item as set forth in claim 1 wherein the cooked food item has a total water content in the range of between about 16% and about 23% by weight of cooked food item and a total plasticizer content in the range of between about 30% and about 47% by weight of cooked food item.

3. A cooked food item as set forth in claim 1 wherein the cooked food item has a total water content in the range of between about 17% and about 22% by weight of cooked food item and a total plasticizer content in the range of between about 30% and about 47% by weight of cooked food item.

4. A cooked food item as set forth in claim 1 wherein the cooked food item has a total water content in the range of between about 17% and about 22% by weight of cooked food item and a total plasticizer content in the range of between about 32% and about 40% by weight of cooked food item.

5. A cooked food item as set forth in claim 1, 2, 3 or 4 wherein the cooked food item is at least about 70% gelatinized.

6. A cooked food item as set forth in claim 5 wherein the cooked food item is at least about 80% gelatinized.

7. A cooked food item as set forth in claim 6 wherein the cooked food item is at least about 90% gelatinized.

8. A cooked food item as set forth in claim 1, 2, 3 or 4 wherein the cooked food item has a water holding capacity of greater than about 1.8.

9. A cooked food item as set forth in claim 8 wherein the cooked food item has a water holding capacity of greater than about 2.0.

10. A cooked food item as set forth in claim 1, 2, 3 or 4 wherein the cooked food item has an $A_w$ in the range of between about 0.7 and about 0.94.

11. A cooked food item as set forth in claim 10 wherein the cooked food item has an $A_w$ in the range of between about 0.75 and about 0.89.

12. A cooked food item as set forth in claim 11 wherein the cooked food item has an $A_w$ in the range of between about 0.82 and about 0.85.

13. A cooked food item as set forth in claim 1, 2, 3 or 4 wherein the cooked food item is stored at about 7° C.

14. A cooked food item as set forth in claim 1, 2, 3 or 4 wherein the cooked food item is in the form of a tortilla shell.

15. A cooked food item as set forth in claim 1, 2, 3 or 4 wherein at least a majority of the starch is from wheat.

16. A cooked food item as set forth in claim 1, 2, 3 or 4 wherein at least a majority of the starch is from corn.

17. A cooked food item as set forth in claim 16 wherein the plasticizer comprises sorbitol.

18. A cooked food item as set forth in claim 1, 2, 3 or 4 wherein the cooked food item has a total water content in the range of between about 18% and about 20% by weight of food item.

19. A cooked food item as set forth in claim 1, 2, 3, 4 or 18 wherein said plasticizer includes fat in the range of between about 6% and about 20% by weight of cooked food item.

20. A cooked food item as set forth in claim 19 wherein said plasticizer includes polyhydric alcohol in the range of between about 2.5% and about 12.5% by weight of cooked food item.

21. A method of making a long shelf life, flexible and crack resistant starch based cooked dough food item, said method comprising:
  (a) forming a dough from plasticizer and flour containing starch;
  (b) forming said dough into a shaped food item;
  (c) cooking said food item until at least about 50% of the starch contained in said flour is gelatinized as measured by loss of birefringence thereby forming a cooked food item, said cooked food item having a total water content of less than about 25% by weight of said cooked food item and a water holding capacity above about 1.5; and
  (d) packaging said cooked food item for storage and whereby said cooked food item is flexible directly from the package after reaching room temperature, without heating.

22. A method as set forth in claim 21 wherein the plasticizer includes water and the cooked food item has a total water content in the range of between about 16% and about 23% by weight of cooked food item and a total plasticizer content in the range of between about 25% and about 55% by weight of cooked food item.

23. A method as set forth in claim 21 wherein the cooked food item has a total water content in the range of between about 17% and about 22% by weight of cooked food item and a total plasticizer content in the range of between about 30% and about 47% by weight of cooked food item.

24. A method as set forth in claim 21 wherein the cooked food item has a total water content in the range of between about 18% and about 20% by weight of cooked food item and a total plasticizer content in the range of between about 32% and about 40% by weight of cooked food item.

25. A method as set forth in claim 21, 22, 23 or 24 wherein the cooked food item is at least about 70% gelatinized.

26. A method as set forth in claim 25 wherein the cooked food item is at least about 80% gelatinized.

27. A method as set forth in claim 26 wherein the cooked food item is at least about 90% gelatinized.

28. A method as set forth in claim 21, 22, 23 or 24 wherein the cooked food item has a water holding capacity of greater than about 1.8.

29. A method as set forth in claim 28 wherein the cooked food item has a water holding capacity of greater than about 2.0.

30. A method as set forth in claim 21, 22, 23 or 24 wherein the cooked food item has an $A_w$ in the range of between about 0.7 and about 0.94.

31. A method as set forth in claim 30 wherein the cooked food item has an $A_w$ in the range of between about 0.75 and about 0.89.

32. A method as set forth in claim 31 wherein the cooked food item has an $A_w$ in the range of between about 0.82 and about 0.85.

33. A method as set forth in claim 21, 22, 23 or 24 wherein the packaged cooked food item is stored at about 7° C. for a period of up to about 90 days while retaining crack resistance.

34. A method as set forth in claim 21, 22, 23 or 24 wherein the cooked food item is a tortilla shell.

* * * * *